United States Patent
Melk

(10) Patent No.: US 12,508,648 B2
(45) Date of Patent: Dec. 30, 2025

(54) CRUSHING OR WEAR PART HAVING A LOCALIZED COMPOSITE WEAR ZONE

(71) Applicant: SANDVIK SRP AB, Svedala (SE)

(72) Inventor: Latifa Melk, Svedala (SE)

(73) Assignee: Sandvik SRP AB, Svedala (SE)

(*) Notice: Subject to any disclaimer, the term of this patent is extended or adjusted under 35 U.S.C. 154(b) by 168 days.

(21) Appl. No.: 18/015,113

(22) PCT Filed: Jul. 7, 2020

(86) PCT No.: PCT/EP2020/069094
§ 371 (c)(1),
(2) Date: Jan. 9, 2023

(87) PCT Pub. No.: WO2022/008038
PCT Pub. Date: Jan. 13, 2022

(65) Prior Publication Data
US 2023/0249246 A1    Aug. 10, 2023

(51) Int. Cl.
*C22C 1/055* (2023.01)
*B22D 19/02* (2006.01)
(Continued)

(52) U.S. Cl.
CPC ............. *B22D 19/02* (2013.01); *B22D 19/06* (2013.01); *C22C 1/055* (2013.01); *C22C 38/04* (2013.01);
(Continued)

(58) Field of Classification Search
None
See application file for complete search history.

(56) References Cited

U.S. PATENT DOCUMENTS

| | | |
|---|---|---|
| 5,989,310 A | 11/1999 | Chu et al. |
| 2011/0226882 A1 | 9/2011 | Berton |

(Continued)

FOREIGN PATENT DOCUMENTS

| | | |
|---|---|---|
| CN | 1868635 A | 11/2006 |
| CN | 101214541 A | 7/2008 |

(Continued)

OTHER PUBLICATIONS

Savoy Piping, "API 5L L450 Seamless Line Pipe", 2021, <https://www.savoypiping.com/api-5l-l450-pipe-stockist-exporter.html>, accessed Feb. 19, 2025. (Year: 2021).*

(Continued)

*Primary Examiner* — Xiaobei Wang
(74) *Attorney, Agent, or Firm* — Corinne R. Gorski

(57) ABSTRACT

A crushing or wear part includes an un-reinforced steel alloy body and at least one in-situ cast localized composite wear zone disposed in the steel alloy body formed of metal carbide or metal boride particles selected from TiC, ZrC, WC, NbC, TaC, TiB$_2$, and ZrB$_2$ distributed in a steel alloy matrix. The at least one in-situ cast localized composite wear zone has a Vickers Hardness that is at least 700 and at least 50% greater than a Vickers Hardness of the un-reinforced steel alloy body. A bonding region that is located between the in-situ cast localized composite wear zone and the steel alloy body is continuous and free of cracks, and the in-situ cast localized composite wear zone is unfragmented.

11 Claims, 8 Drawing Sheets

(51) Int. Cl.
*B22D 19/06* (2006.01)
*C22C 38/04* (2006.01)

(52) U.S. Cl.
CPC ............... *Y10T 428/12576* (2015.01); *Y10T 428/12958* (2015.01)

(56) References Cited

U.S. PATENT DOCUMENTS

2011/0303778 A1* 12/2011 Berton ................ C22C 1/1036
164/91
2018/0369905 A1* 12/2018 Olejnik ................ C22C 38/04

FOREIGN PATENT DOCUMENTS

| CN | 106457400 A | 2/2017 |
| CN | 108348995 A | 7/2018 |
| WO | 2017081665 A1 | 5/2017 |

OTHER PUBLICATIONS

Wiezorek, A.N., "Comparative Studies on the Wear of ADI Alloy Cast Irons as well as Selected Steels and Surface-Hardened Alloy Cast Steels in the Presence of Abrasive", 2017, Arch. Metall. Mater., vol. 62 Issue 1, pp. 119-128. (Year: 2017).*

* cited by examiner

20% Moderator

30% Moderator

20% Moderator

30% Moderator

40% Moderator

70% Moderator

40% Moderator

70% Moderator

CRUSHING OR WEAR PART HAVING A LOCALIZED COMPOSITE WEAR ZONE

RELATED APPLICATION DATA

This application is a § 371 National Stage Application of PCT International Application No. PCT/EP2020/069094 filed Jul. 7, 2020.

FIELD OF THE INVENTION

The present invention relates to a crushing and wear part having a localised composite wear zone.

BACKGROUND TO THE INVENTION

Crushing and wear parts employed in crushing machines in the mining industry are exposed to high levels of wear over time and are often required to be reinforced with hard composite materials such as cemented carbide. Examples of crushing and wear parts are concaves (inner shells) and arm-liners of cone crushing machines, jaw plates for jaw crushers machines, and wear plates for vertical shaft impact crushers. The cemented carbide is often provided as a wear bar that is cast in a specific shape configured for retro-fitting to the crushing and wear parts.

Cast parts of machines and equipment having localised composite wear zones made by in-situ casting of the composite wear zone are described in a number of prior art documents, including US2011/0226882 and US2011/0303778. The process for making the cast parts comprises making a powder composition comprising reactants for forming a metal carbide or boride, for example titanium and carbon, compressing the composition to form an insert, placing the insert in a mold cavity, and then pouring molten steel into the mold where the heat supplied by the molten steel initiates the synthesis of titanium carbide in-situ in the mold by Self Propogating High Temperature Synthesis (SHS) providing a steel cast part with localised titanium carbide wear zones. The processes described in these prior art documents have been shown to have limitations; the cast parts produced according to the process of US2011/0226882 tend to have an uneven distribution of TiC crystals in the composite wear zone leading to fragmentation and cracks, and the cast parts produced according to the process of US2011/0303778 tend to have limited hardness leading to chipping of the wear zones.

WO2017081665 describes a process for making crushing and wear part having a localised composite wear zone. The process is broadly the same as the processes described above except that the powder composition for making the casting insert includes (in addition to the carbide reactants) a moderator powder comprising a mixture of powders configured to form a matrix in the composite zone after crystallisation. The moderator formulations employed include pure Iron, cast Hadfield Steel powder (about 77% Fe), NiHard 4 Chromium (about 77% Fe) and High Chromium Cast iron (about 67% Fe). For the carbides, the best hardness was achieved employed 60-70 wt % moderator powder selected from high chromium cast iron powder and NiHard 4 chromium powder. Composite wear zones formed from pure iron moderator powders were partially or totally fragmented and failed to exhibit a hardness greater that the surrounding base alloy.

It is an object of the invention to overcome at least one of the above-referenced problems.

SUMMARY OF THE INVENTION

The Applicant has surprisingly discovered that the hardness and morphology of in-situ cast wear zones is informed by the size of the carbide or boride particles in the wear zone, and that harder and unfragmented wear zones may be achieved by reducing the carbide or boride average particle size in the in-situ case wear zone to less than 5 µm and ideally between 0.5 to 3 µm. The Applicant has discovered that controlling the carbide or boride average particle size provides an in-situ cast wear zone that exhibits high Vickers Hardness (for example 700 to more than 1000 VH), and that is significantly greater (typically at least 50% greater) than a Vickers Hardness of the un-reinforced steel alloy body. The crushing or wear parts of the invention are ideal for use in crushing machines for rock and aggregate that are exposed to high wear, for example concaves for cone crushers, jaw plates for jaw crushers, and arm-liners for crushing machines.

In a first aspect, the invention provides a crushing or wear part comprising:
(a) an un-reinforced metal body; and
(b) at least one in-situ cast localized composite wear zone disposed in the un-reinforced metal body comprising metal carbide or metal boride particles typically selected from TiC, WC, ZrC, NbC, TaC, $TiB_2$, and $ZrB_2$ distributed in a steel alloy matrix, characterised in that the metal carbide or boride particles have an average dimension of 0.5 to 3.0 µm, and the at least one in-situ cast localized composite wear zone typically has a Vickers Hardness that is at least 700 and typically has at least 50% greater than a Vickers Hardness of the un-reinforced metal body.

In any embodiment, the metal carbide or metal boride particles have an average dimension of 0.5 to 1.5 µm.

In any embodiment, the un-reinforced metal body is a steel alloy, for example a hardened steel such as manganese steel. In other embodiment, the un-reinforced metal body is cast iron or another alloy such as aluminium alloy.

In any embodiment, a bonding region between the in-situ cast localized composite wear zone and the un-reinforced metal body is continuous and free of cracks. This provides for a more robust wear zone having a longer life.

In any embodiment, the in-situ cast localized composite wear zone is unfragmented. This provides for a wear zone having greater hardness and resistance to wear.

In any embodiment, the at least one in-situ cast localized composite wear zone has a Vickers Hardness at least 70% greater than the un-reinforced metal body.

In any embodiment, the at least one in-situ cast localized composite wear zone has a Vickers Hardness of at least 900.

In any embodiment, the metal carbide or boride is a carbide. In any embodiment, the carbide is titanium carbide.

In any embodiment, the steel alloy is manganese steel.

In any embodiment, the at least one in-situ cast localized composite wear zone has a wear ratio of less than 25×106 $mm^3$/mN as determined in a pin on disc test using a Tribo-meter MFT-5000 with a load of 10 N, a duration of 120 minutes, and a sliding distance of 576 m.

In any embodiment, the crushing or wear part of the invention comprises a plurality of spaced-apart in-situ cast localized composite wear zones.

In any embodiment, the crushing or wear part of the invention is a concave for a cone crusher having a crushing zone, in which the plurality of spaced-apart in-situ cast localized composite wear zones are circumferentially spaced apart around the crushing zone.

In any embodiment, the crushing or wear part of the invention is a jaw plate for a jaw crusher.

In any embodiment, the at least one in-situ cast localized composite wear zone is formed by in-situ casting of a casting insert comprising densified powder comprising a mixture of metal powders.

Other aspects and preferred embodiments of the invention are defined and described in the other claims set out below.

BRIEF DESCRIPTION OF THE FIGURES

FIG. 4 is a series of electron micrographs showing wear zones made according to the process of the invention under high magnification (top row) and low magnification (bottom row). The wear zones differ according to the wt % of moderator in the insert, with four examples provided 20%, 30%, 40% and 70% 20 moderator made according to Examples 1 to 4, respectively:

FIG. 4A 20% moderator low magnification
FIG. 4B 30% moderator low magnification
FIG. 4C 20% moderator high magnification
FIG. 4D 30% moderator high magnification
FIG. 4E 40% moderator low magnification
FIG. 4F 70% moderator low magnification
FIG. 4G 40% moderator high magnification
FIG. 4H 70% moderator high magnification The increase of moderator from 20% to 70% induces a decrease in the particle sizes from 3 μm up to 0.2 μm respectively.

DETAILED DESCRIPTION OF THE INVENTION

Figure 1:
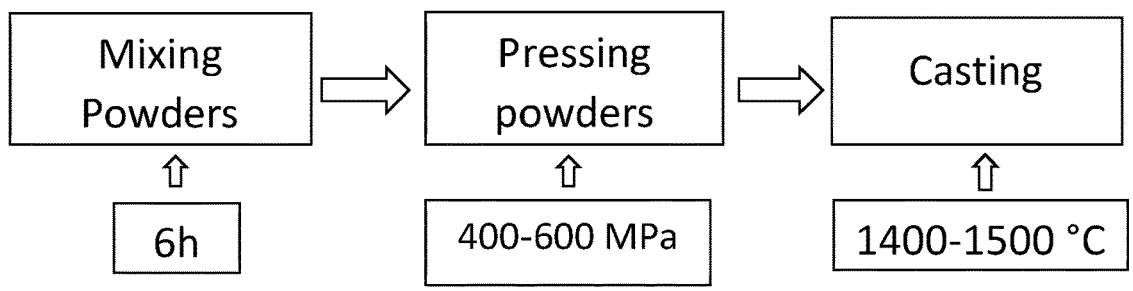
FIG. 1 illustrates a process of the invention including a powder mixing step, a powder pressing (densification) step, and an in-situ casting step.

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

"Crushing or wear part" refers to a part or component an industrial machine such as a mining or excavation machine (especially rock crushing machines), that is exposed to high levels of abrasion and wear. Specific non-limiting examples include inner cones of cone crushing machines, jaw plates for jaw crusher machines, arm liners, and wear plates for vertical shaft impact crushers.

"Localised composite wear zone" or "reinforced wear zone" refers to a part of the crushing or wear part that is reinforced with metal carbide or boride particles by a process described herein. An example would be a circumferential region of a concave for a cone crusher below the material inlet. The wear zone comprises a composite of metal carbide or boride particles distributed throughout a matrix formed of the base alloy, and generally has a hardness greater than that of the base alloy due to the carbide or boride particles in the wear zone. The wear zone is generally formed using a plurality of casting inserts.

"Powder reactants suitable for forming a metal carbide or boride selected from TiC, WC, ZrC, NbC, TaC, $TiB_2$, $ZrB_2$" refers to graphite powder (in the case of metal carbides) or boride powder (in the case of boride) along with a metal powder selected from Ti (titanium), W (tungsten), Nb (niobium), Zr (zirconium) and Ta (tantalum). The graphite or boride powder, and metal powder, are generally provided in a weight ratio of about 1:2 to 2:1, 1:1.5 to 1.5:1, and preferably about 1:1. The graphite or boride powder generally has a an average particle size of 5-15, 5-10, or 10-15 μm. The metal powder generally has an average particle size of 40-60, 40-50 or 45-50 μm. The powders generally have a purity of about 97-99%.

"Moderator powder" refers to a powder that is mixed with the carbide or boride reactants powder and compressed to form the casting insert. It is composed of elements selected from the elements contained in small amounts in the steel alloy, for example chromium, silicon, carbon, manganese and iron. This provides for improved infiltration and bonding between the inserts and base alloy during casting Generally, the casting insert comprises 20-90%, 20-80%, 20-70%, 20-60%, 20-50%, 30-50%, 35-45% and about 40% by weight moderator powder.

"Casting insert" refers to a powder composition compressed into a 3-D shape suitable for inserting into a casting mold, and containing powder reactants configured to form localised regions of carbide or boride particles in a wear zone of the crushing or wear part by in-situ casting. The insert is generally provided in the shape or a bar or plate, although other shapes are envisaged.

"Steel alloy" refers to steel that is alloyed with one or more elements (additional elements) to improve the mechanical properties of the steel. Steel alloy generally includes carbon (for example 0.1 to 1.0% by weight) and one or more additional elements selected from manganese, nickel, chromium, molybdenum, vanadium, silicon and boron.

"Unfragmented" as applied to a wear zone means a wear zone that is not fragmented. Fragmentation in wear zones produced by in-situ casting is characterised by a wear zone that is diffuse and/or fragmented into different parts, resulting in a cast product in which the wear zone does not have the defined shape of the casting insert. Fragmented wear zones can be easily identified by visual inspection of the shape or footprint of the wear zone in the cast product.

"Un-reinforced" as applied to the metal body means that the metal body is not reinforced with metal carbide or metal boride particles. For the avoidance of doubt, the un-reinforced metal body may be a hardened steel alloy such as manganese steep.

"Powder" refers to a particulate composition having an average particle size in the micron range, particularly less than 100 microns.

Exemplification

The invention will now be described with reference to specific Examples. These are merely exemplary and for illustrative purposes only: they are not intended to be limiting in any way to the scope of the monopoly claimed or to the invention described. These examples constitute the best mode currently contemplated for practicing the invention.

Materials:
Titanium powder having a purity of 97-99% and particle size of 40-60 μm.
Graphite powder having a purity of 97-99% and particle size of 5-15 μm.
Base alloy is manganese steel.
Sand mold and metal fasteners.

Method of Making Test Wear Plates with In-Situ Casting of Wear Zones:

A: Titanium, graphite and moderator powders are mixed in a wt ratio of according to Table 1 below. The powder composition is mixed for 6 hours to ensure a homogenous of the powders.

TABLE 1

| Powder | Example 1 | Example 2 | Example 3 | Example 4 |
| --- | --- | --- | --- | --- |
| Titanium | 40 wt % | 35 wt % | 30 wt % | 15 wt % |
| Graphite | 40 wt % | 35 wt % | 30 wt % | 15 wt % |
| Moderator | 20 wt % | 30 wt % | 40 wt % | 70 wt % |

Figure 2:
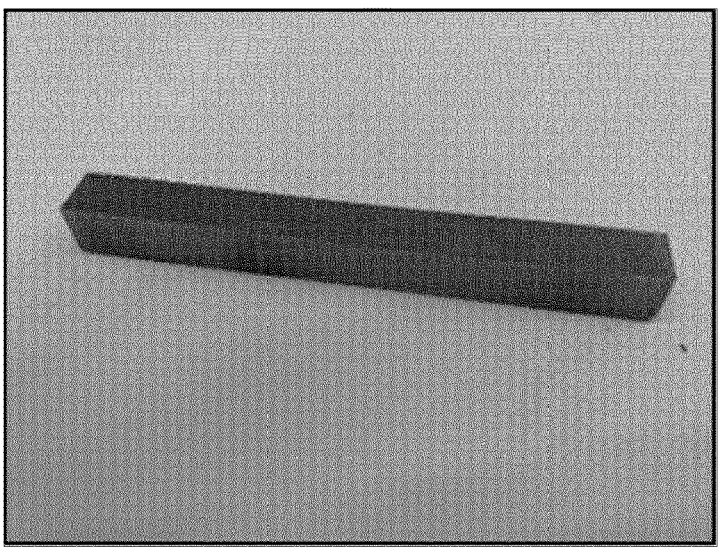
FIG. 2 is a photograph of a casting insert formed according to a process of the invention.
Figure 3:
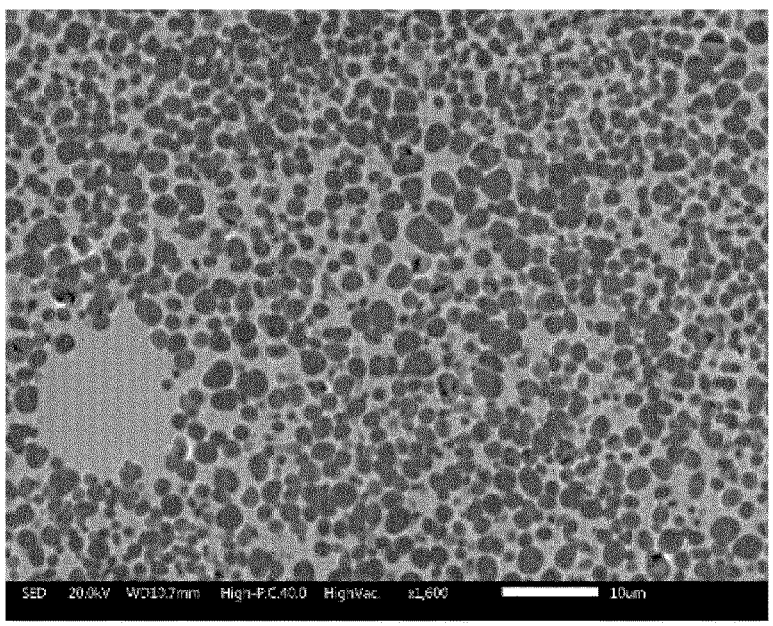
FIG. 3 is a Scanning Electron microscope micrograph of part of an in-situ cast composite wear zone showing the titanium carbide particles dispersed in a matrix of the base alloy (manganese steel alloy).
Figure 4A:
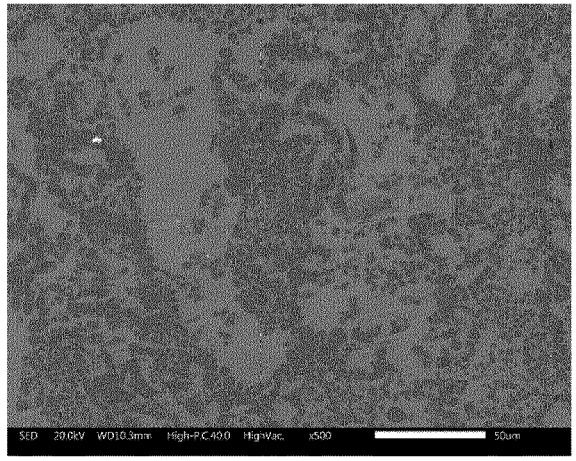
Figure 4B:
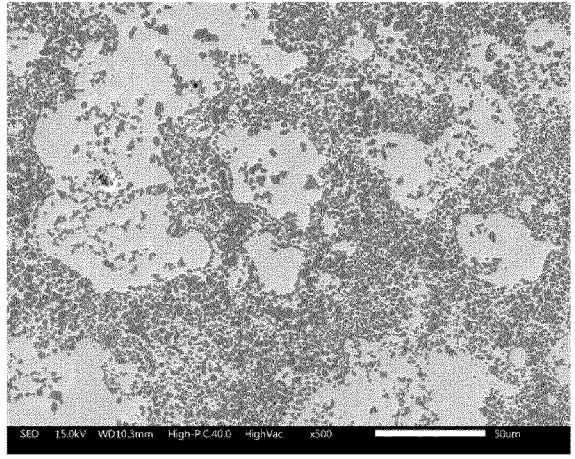
Figure 4C:
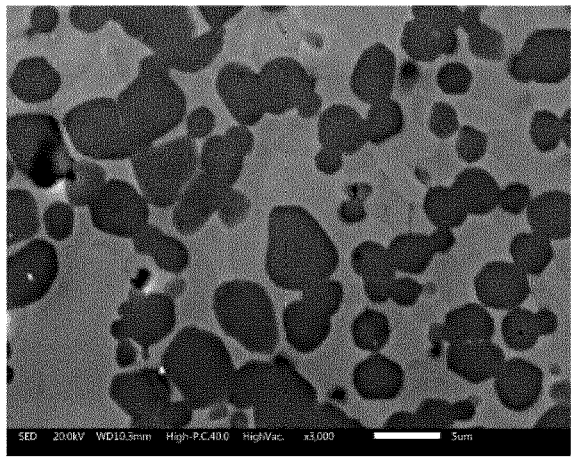
Figure 4D:
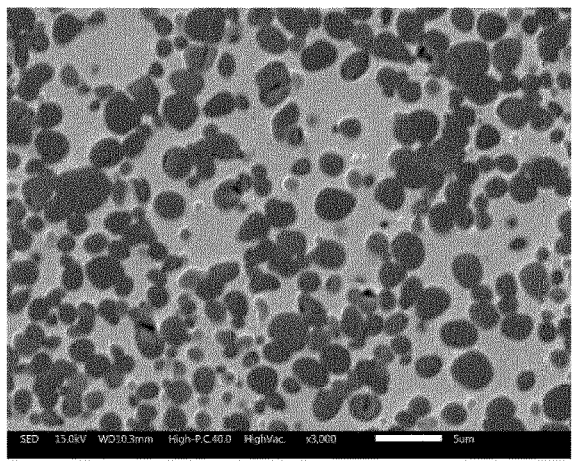
Figure 4E:
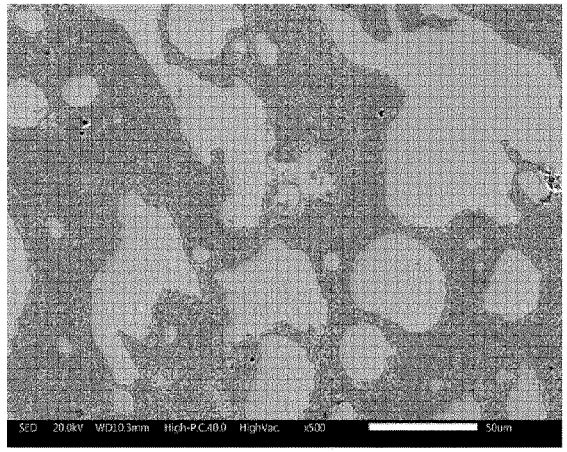
Figure 4F:
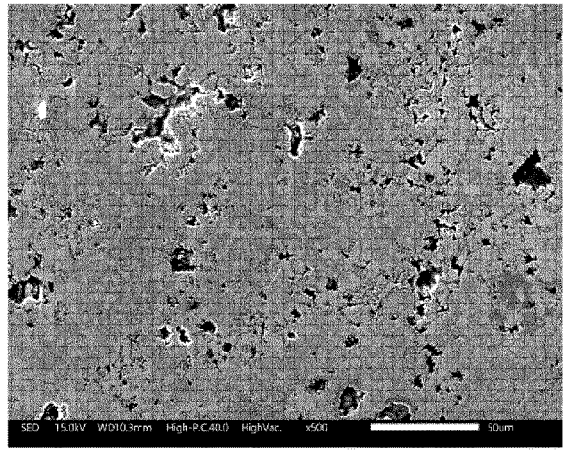
Figure 4G:
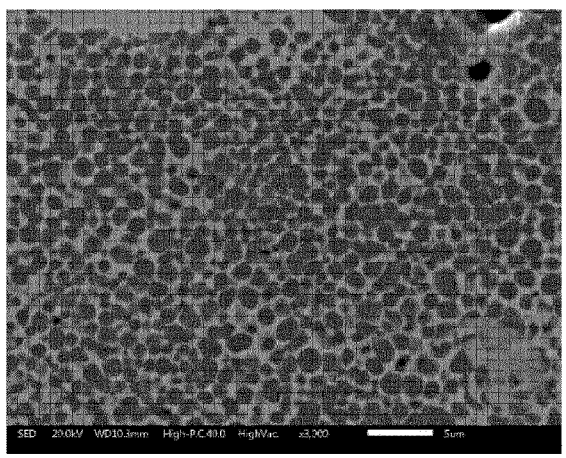
Figure 4H:
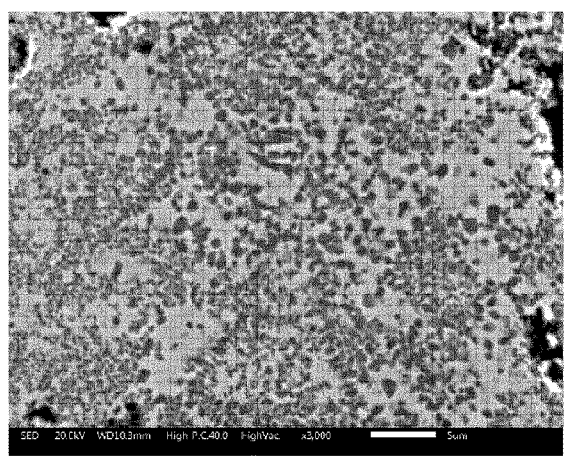
Figure 5A:
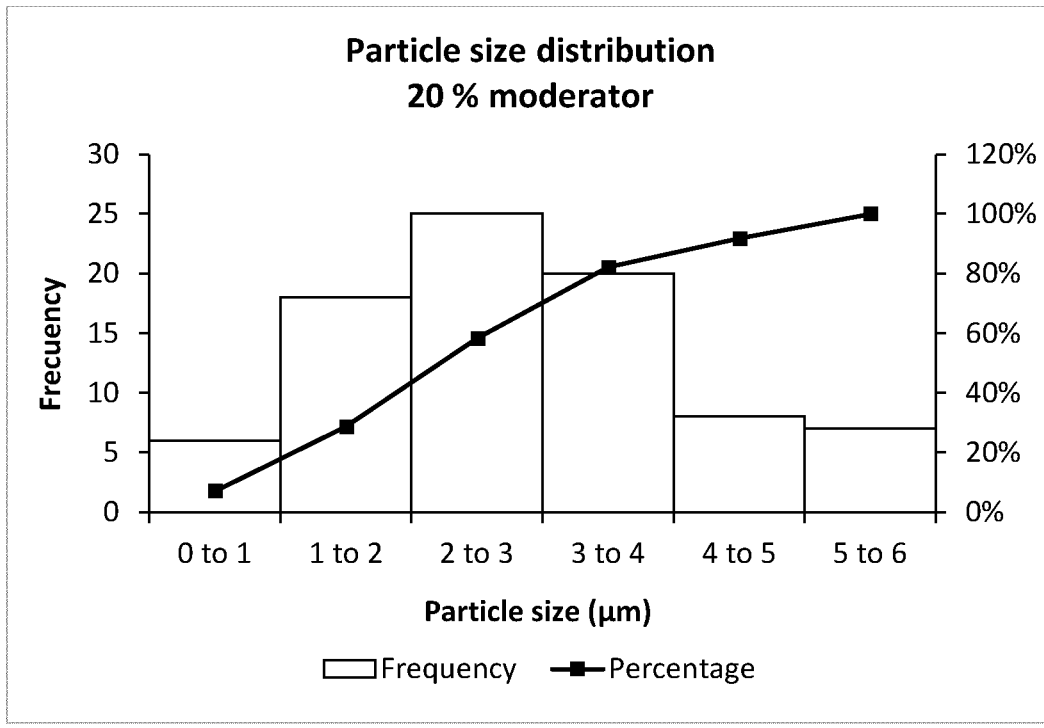
FIG. 5 presents graphs showing the particle size distribution for the four examples of wear zones made according to Examples 1 to 4 using casting inserts having 20% (FIG. 5A), 30% (FIG. 5B), 40% (FIG. 5C) and 70% (FIG. 5D) by weight of moderator, respectively. The average particle size for the 20%, 30%, 40% and 70% weight moderator examples are 2-3 μm (20%), 1-2 μm (30%), 0.5 to 1.5 μm (40%), and 0.2 to 0.6 μm (70%), with the average particle size across the range of 20-70% moderator being 0.5 to 3.0%.
Figure 5B:
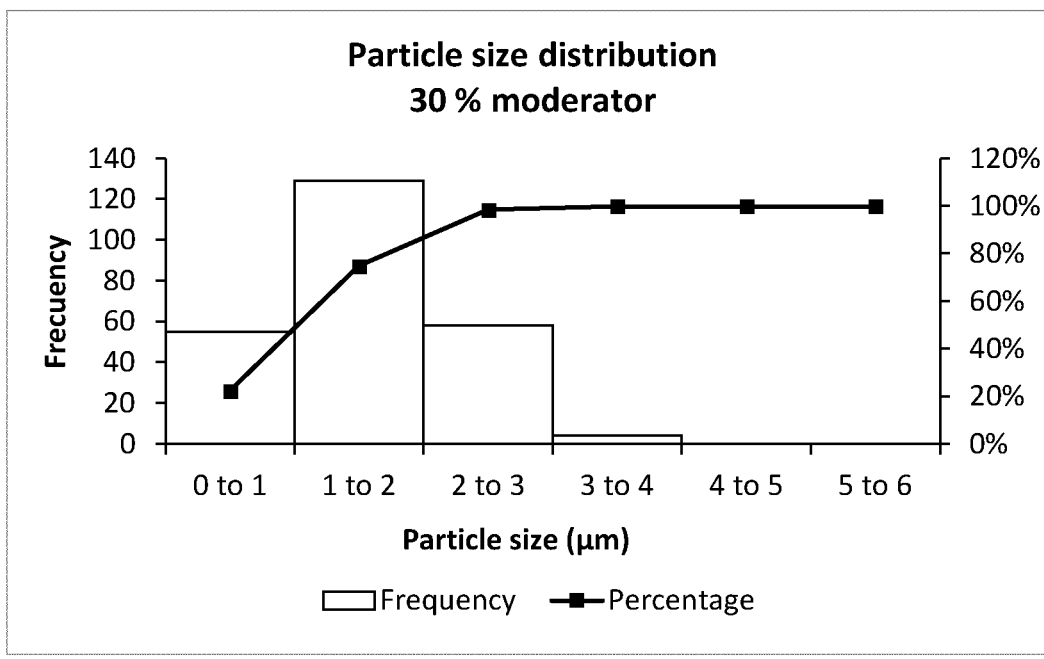
Figure 5C:
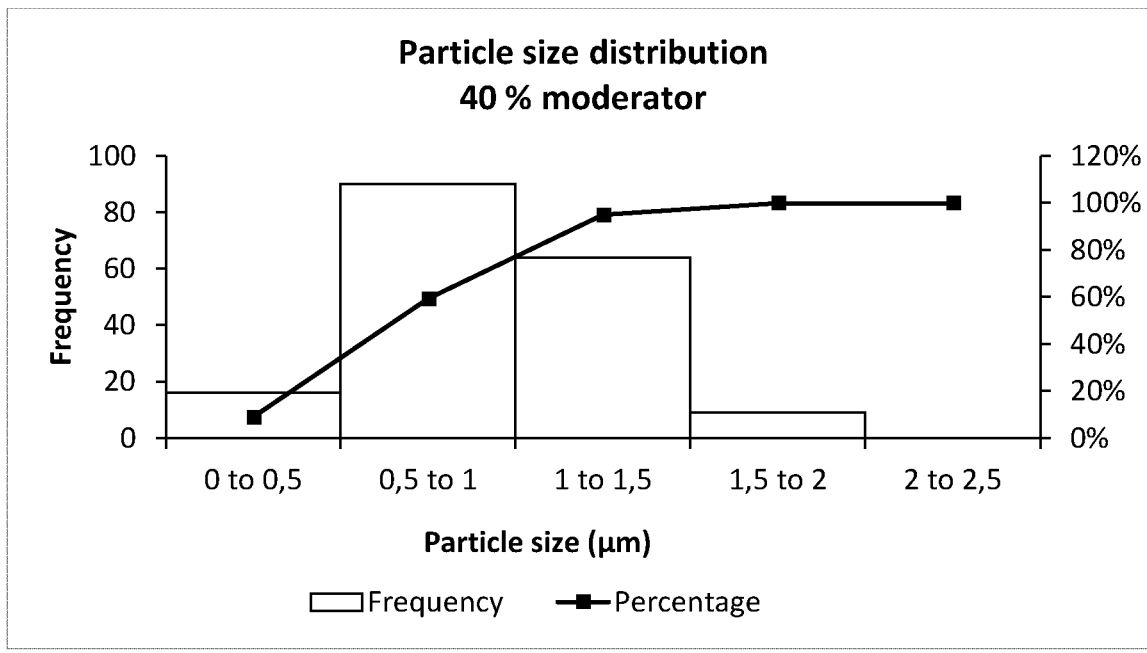
Figure 5D:
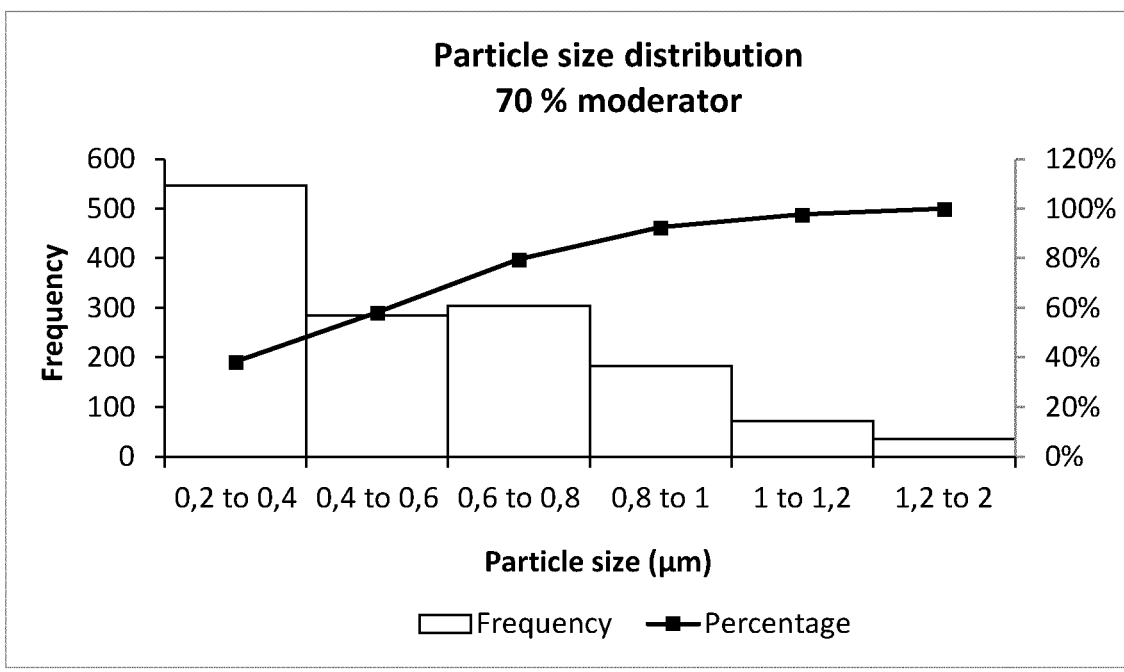

B: The powder composition is compacted in a uniaxial pressing machine at 450-600 MPa to form an elongated casting insert having dimensions of approximately 100×20×15 mm shown in FIG. 2. The compacted particles in the insert are shown in FIG. 3.

C: The inserts are placed in a sand casting mold, and fixed in position with metal plates that are bolted to the mold.

D: Molten manganese steel is poured into the molds at 1400° C., and the heat of the molten steel initiates the synthesis of titanium carbide in-situ in the mold by Self Propogating High Temperature Synthesis (SHS) providing a manganese steel cast part with localised Titanium carbide reinforced wear zones.

E: The cast is heat treated and then cooled and the test wear part is released from the mold.

Method of Measuring Vickers Hardness:

Micro-hardness measurements were carried out following the testing method described in ASTM E92-16. A load of 50 gf was applied and 20 indentations were performed in both the matrix and the reinforced zone.

Method of Measuring Particle Size Distribution of TiC Particles in Wear Zone

The composition analysis was performed by using the Scanning Electron Microscopy (SEM) and the energy dispersive X-ray spectroscopy detector (EDS). The particle sizes were measured using MIPAR image analysis software Wear Ratio Measurement:

The wear test was performed using a tribo-meter MFT-5000. The method of carrying out the wear test was described in following the standard ASTM G99-17.

A pin in the configuration of an Alumina ball with 2 mm in radius was pressed against the specimen. Th test was carried out under a load of 10 N, a speed of 390 rpm and a sliding distance of 576 meter for a duration of 2 hours.

Once the test is finished, the wear ratio can be calculated by multiplying the area of the track which corresponds to the volume loss, then divided by the force and the sliding distance as it can be seen from the equation below:

$$\text{Wear ratio } (mm3/N*M) = \frac{\text{Volume loss } (mm3)}{\text{Force(N)} \times \text{Sliding distance } (M)}$$

Results—Vickers Hardness

Figure 6:
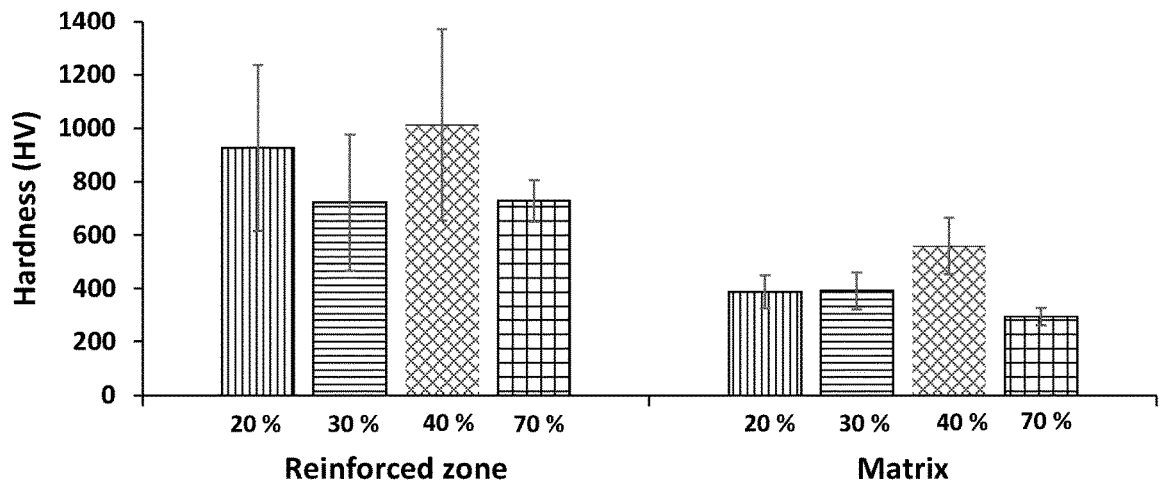
FIG. 6 presents graphs showing the Vickers Hardness for the four examples of wear parts made according to Examples 1 to 4 using casting inserts having 20%, 30%, 40% and 70% by weight of moderator, respectively. For example, the Vickers Hardness of the wear zone and the manganese steel base alloy are provided showing that the process of the invention provides wear parts in which the hardness of the in-situ cast wear zone is significantly higher than the hardness of the base alloy.
Figure 7:
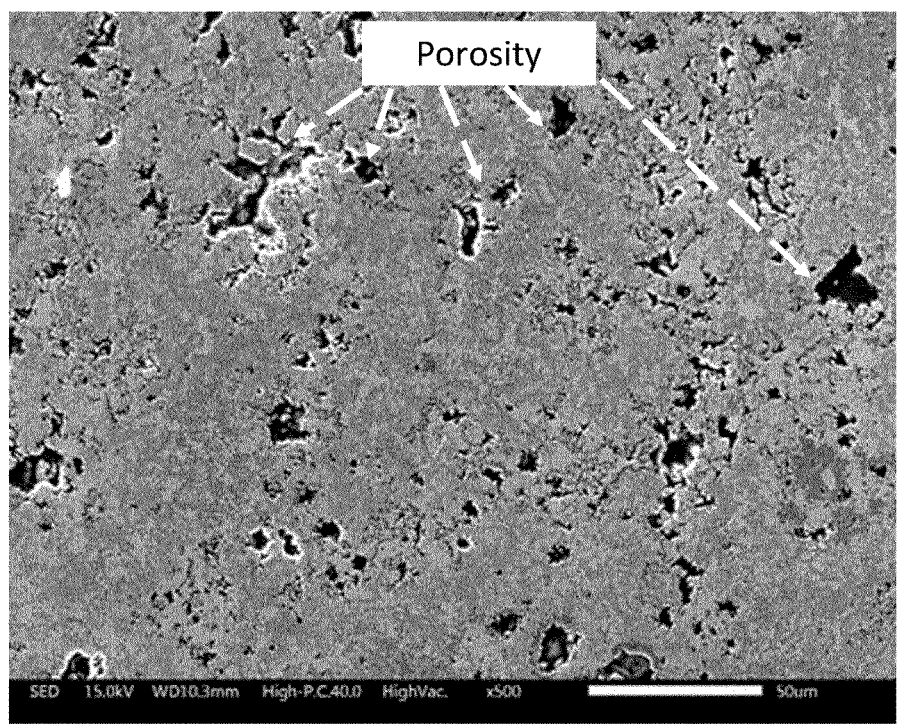
FIG. 7 is an electron micrograph showing a wear zone made according to Example 4 with 70% by weight moderator powder. There is a strong correlation between the high hardness results and the microstructure of the composites. When the moderator weight percent increases, it results in high amount of TiC is formed and small particle sizes. Thus, the hardness increases. When the moderator amount reaches 70%, it results in large amount of porosity as indicated, which induces low hardness.
Figure 8:
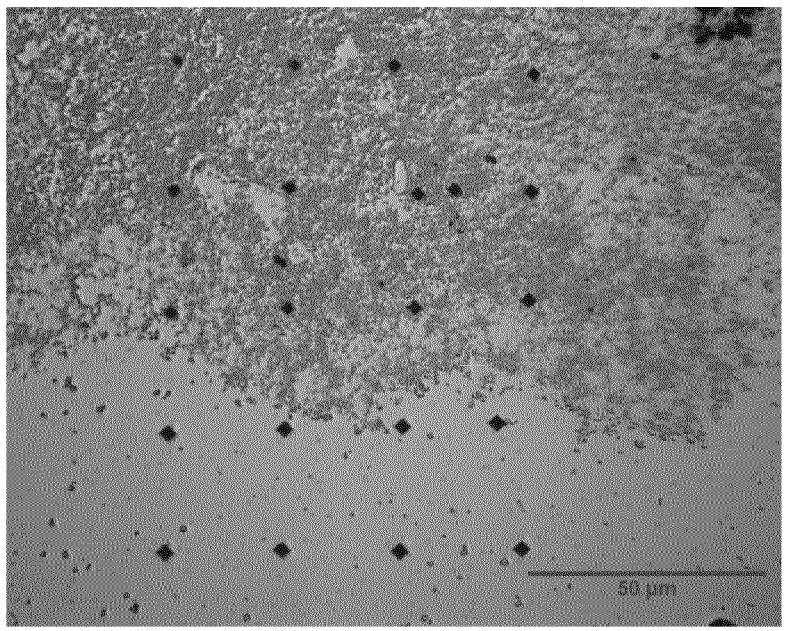
FIG. 8 is a picture showing a border region between a TiC reinforced wear zone and an adjacent steel alloy.
Figure 9:
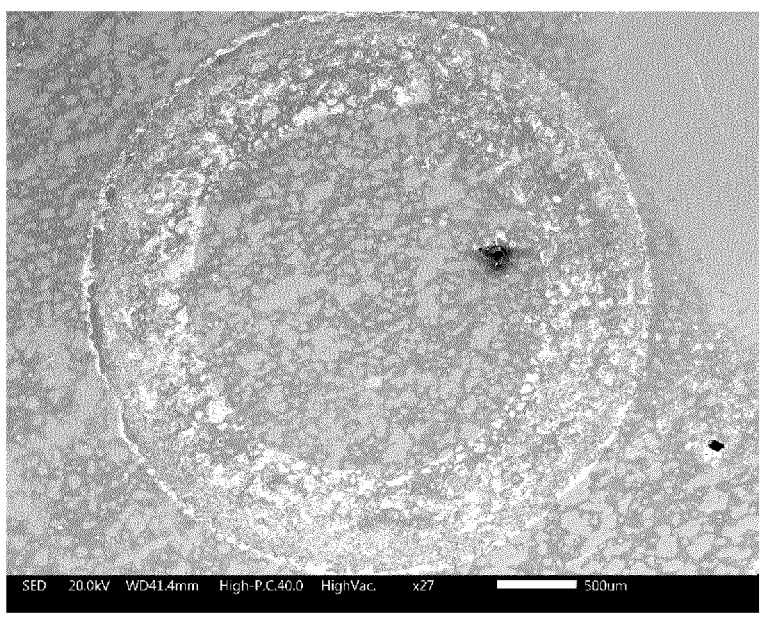
FIG. 9 is a picture showing a section of a reinforced wear zone after performing a pin-on-disc wear test
Figure 10:
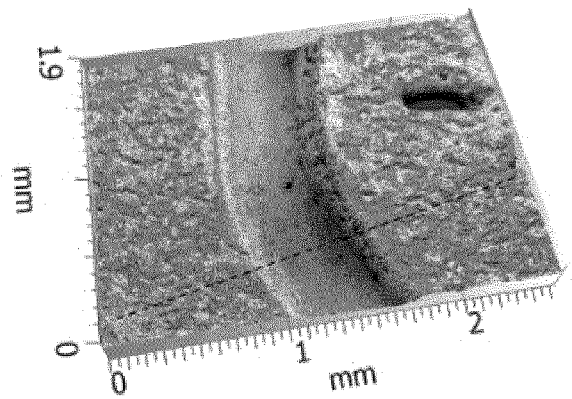
FIG. 10 is a profilometer picture showing volume loss from the wear track formed during the pin-on-disc wear test.

The wear zone and base alloy of all test wear plates were analysed for Vickers Hardness (VH). The results are shown in FIG. 6. In each test plate, the average VH of the wear zone was >80% higher than the average VH of the base alloy. The wear zone with the highest VH was Example 2 made with 40% moderator powder by weight, with an average VH of 1013.1 and an increase in VH compared to the base alloy of >100%. All examples exhibited a wear zone VH of >700.

Results—Particle Size Distribution

As illustrated in FIGS. 5 and 6, Example 3 (40% moderator) provided a wear zone containing tightly packed titanium carbide particles, with about 90% of the particles having a dimension of 0.5 to 1.5 µm.

The average particle size for Example 1, 2 and 4 are 2-3 µm, 1-2 µm, and 0.2 to 0.6 µm, with the average particle size across the range of 20-70% moderator being 0.5 to 3.0 µm.

Results—Wear Ratio

Figure 11:
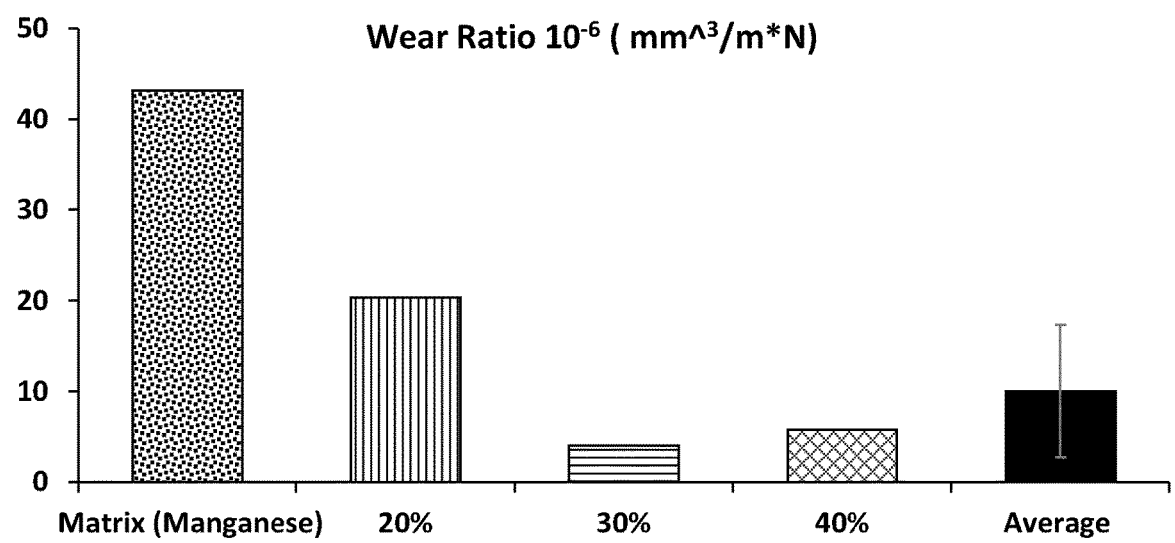
FIG. 11 is a graph of the wear ratio for the wear zones of the wear plates made according to Examples 1 to 4 and the base alloy.

As illustrated in FIG. 11, the wear ratio of the wear zones in the test plates of Examples 1-3 was reduced significantly (at least 50% reduction) compared with the wear ratio of the base alloy. In Examples 2 and 3, the wear ratio was less than 6 compared with the base alloy wear ratio of 43.2.

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

The invention claimed is:

1. A crushing or wear part comprising:
an un-reinforced manganese steel alloy body; and
at least one in-situ cast localized composite wear zone, formed by in-situ casting of a casting insert, disposed in the manganese steel alloy body, the at least one in-situ cast localized composite wear zone comprising metal carbide or metal boride particles selected from TiC, ZrC, NbC, TaC, $TiB_2$, and $ZrB_2$ distributed in a steel alloy matrix, wherein the metal carbide or metal boride particles have an average dimension of 0.5 to 3.0 µm, and the at least one in-situ cast localized composite wear zone has a Vickers Hardness that is at least 700 and at least 50% greater than a Vickers Hardness of the un-reinforced manganese steel alloy body, wherein a bonding region disposed between the in-situ cast localized composite wear zone and the un-reinforced manganese steel alloy body is continuous and free of cracks, and wherein the in-situ cast localized composite wear zone is unfragmented such that the wear zone is not fragmented into different parts and retains a defined shape of the casting insert, and wherein the casting insert includes 20-40% by weight moderator powder.

2. The crushing or wear part according to claim 1, wherein the at least one in-situ cast localized composite wear zone has a Vickers Hardness at least 70% greater than the un-reinforced manganese steel alloy body.

3. The crushing or wear part according to claim 1, wherein the at least one in-situ cast localized composite wear zone has a Vickers Hardness of at least 900.

4. The crushing or wear part according to claim 1, wherein the metal carbide or metal boride particles have an average dimension of 0.5 to 1.5 µm.

5. The crushing or wear part according to claim 1, wherein the metal carbide or boride is titanium carbide.

6. The crushing or wear part according to claim 1, wherein the steel alloy is manganese steel.

7. The crushing or wear part according to claim 1, wherein the at least one in-situ cast localized composite wear zone has a wear ratio of less than $25 \times 10^6$ mm$^3$/mN as determined in a pin on disc test with a load of 10 N, a duration of 120 minutes, and a sliding distance of 576 m.

8. The crushing or wear part according to claim 1, wherein the at least one in-situ cast localized composite wear zone is a plurality of spaced-apart in-situ cast localized composite wear zones.

9. The crushing or wear part according to claim 8, which is a concave for a cone crusher having a crushing zone, in which the plurality of spaced-apart in-situ cast localized composite wear zones are circumferentially spaced apart around the crushing zone.

10. The crushing or wear part according to claim 8, which is a jaw plate for a jaw crusher.

11. The crushing or wear part according to claim 1, wherein the at least one in-situ cast localized composite wear zone is formed by in-situ casting of the casting insert that comprises densified powder comprising a mixture of metal powders.

* * * * *